United States Patent
Zhang et al.

(10) Patent No.: US 10,992,245 B2
(45) Date of Patent: Apr. 27, 2021

(54) POSITION ESTIMATION OF PERMANENT MAGNET SYNCHRONOUS MACHINES THROUGH VIBRATION INDUCED SALIENCY

(71) Applicant: STEERING SOLUTIONS IP HOLDING CORPORATION, Saginaw, MI (US)

(72) Inventors: Zhe Zhang, Fenton, MI (US); Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 15/928,501

(22) Filed: Mar. 22, 2018

(65) Prior Publication Data
US 2018/0278189 A1    Sep. 27, 2018

Related U.S. Application Data

(60) Provisional application No. 62/474,883, filed on Mar. 22, 2017.

(51) Int. Cl.
*H02P 21/18* (2016.01)
*H02P 21/22* (2016.01)
(Continued)

(52) U.S. Cl.
CPC .............. *H02P 21/18* (2016.02); *B62D 5/046* (2013.01); *B62D 5/0409* (2013.01);
(Continued)

(58) Field of Classification Search
CPC .......... H02P 6/183; H02P 21/18; H02P 21/13; H02P 21/32; H02P 2203/11
See application file for complete search history.

(56) References Cited

U.S. PATENT DOCUMENTS

| | | | |
|---|---|---|---|
| 6,492,788 B1 * | 12/2002 | Agirman | H02P 21/18 318/700 |
| 2004/0113582 A1 * | 6/2004 | Ide | H02P 6/185 318/717 |

(Continued)

FOREIGN PATENT DOCUMENTS

| | | |
|---|---|---|
| CN | 102545740 A | 7/2012 |
| CN | 102624322 A | 8/2012 |

(Continued)

OTHER PUBLICATIONS

Chinese Office Action and Search Report from the China National Intellectual Property Administration (CNIPA) for related Chinese Application No. 201810240695.9 dated Jan. 6, 2021.

*Primary Examiner* — Zoheb S Imtiaz
(74) *Attorney, Agent, or Firm* — Dickinson Wright PLLC (57) ABSTRACT

Technical solutions are described herein for position estimation of permanent magnet synchronous machines through vibration induced saliency. An example permanent magnet synchronous machine (PMSM) includes a motor control system to provide input command to the motor to cause a position of the motor to change. The PMSM further includes a motor position estimation module configured to estimate the position of the motor. The estimation includes measuring a current $I_{abc}$ across the motor. The estimation further includes extracting a filtered current $I_{abc\_inj}$ at a predetermined frequency from the current $I_{abc}$. The estimation further includes estimating the position of the motor based on the filtered current $I_{abc\_inj}$.

20 Claims, 9 Drawing Sheets

(51) Int. Cl.
  *B62D 5/04* (2006.01)
  *H02P 21/24* (2016.01)
  *H02P 6/18* (2016.01)
  *B62D 6/00* (2006.01)

(52) U.S. Cl.
  CPC ............ *B62D 5/0463* (2013.01); *H02P 6/183* (2013.01); *H02P 21/22* (2016.02); *H02P 21/24* (2016.02); *B62D 6/00* (2013.01)

(56) References Cited

U.S. PATENT DOCUMENTS

| | | | |
|---|---|---|---|
| 2005/0151502 A1* | 7/2005 | Quirion | H02P 6/182 318/715 |
| 2008/0169782 A1* | 7/2008 | Piippo | H02P 21/26 318/715 |
| 2010/0301790 A1 | 12/2010 | Liu et al. | |
| 2012/0153883 A1* | 6/2012 | Hammel | H02P 25/03 318/400.33 |
| 2013/0033254 A1* | 2/2013 | Shinnaka | H02P 21/26 324/160 |
| 2014/0225548 A1* | 8/2014 | Xu | H02P 21/13 318/400.33 |
| 2015/0100264 A1* | 4/2015 | Qian | G01D 5/2046 702/94 |
| 2016/0069711 A1* | 3/2016 | Frese | G01D 5/006 324/207.16 |

FOREIGN PATENT DOCUMENTS

| | | |
|---|---|---|
| CN | 104022711 A | 9/2014 |
| CN | 105024615 A | 11/2015 |

* cited by examiner

FIG. 9

POSITION ESTIMATION OF PERMANENT MAGNET SYNCHRONOUS MACHINES THROUGH VIBRATION INDUCED SALIENCY

This application claims priority from U.S. Patent Application Ser. No. 62/474,883, filed on Mar. 22, 2017, entitled "POSITION ESTIMATION OF PERMANENT MAGNET SYNCHRONOUS MACHINES THROUGH VIBRATION INDUCED SALIENCY," the entire contents of which are incorporated herein by reference.

BACKGROUND

Permanent magnet synchronous machines (PMSMs) have been found to be suitable for numerous adjustable-speed industrial applications due to their advantages such as high power density, high efficiency, and high reliability. Among the existing control methods, Field Oriented Control (FOC) is the most widely adopted in PMSM drive systems because it offers the advantages of fast dynamic response and good robustness to the systems. Generally, to generate the correct torque with FOC, the accurate rotor position information is indispensable. An FOC controlled PMSM drive system is typically equipped with a rotor position sensor.

It is desirable to control PMSM without a rotor position sensor.

SUMMARY

The technical solutions herein facilitate rotor position detection on PMSMs through vibration induced saliency. The technical solutions herein fill the absence of sensorless control for low saliency PMSMs, for example, surface-mounted permanent magnet (SPM) permanent magnet machines, in zero to low speed operation, which is a technical challenge in sensorless control for PMSMs. It should be noted that, the technical solutions herein are applicable to any type of PMSM, and are not limited to any specific application, configuration or geometry.

According to one or more embodiments of the present invention, a permanent magnet synchronous machine (PMSM) includes a motor control system to provide input command to the motor to cause a position of the motor to change. The PMSM further includes a motor position estimation module configured to estimate the position of the motor. The estimation includes measuring a current $I_{abc}$ across the motor. The estimation further includes extracting a filtered current $I_{abc\_inj}$ at a predetermined frequency from the current $I_{abc}$. The estimation further includes estimating the position of the motor based on the filtered current $I_{abc\_inj}$.

According to one or more embodiments of the present invention a method for determining a motor position using vibration induced saliency includes measuring a current $I_{abc}$ across a motor, the current caused by an input command to the motor to cause a position of the motor to change. The method further includes extracting a filtered current $I_{abc\_inj}$ at a predetermined frequency from the current $I_{abc}$. The method further includes estimating the position of the motor using the filtered current $I_{abc\_inj}$.

According to one or more embodiments of the present invention a power steering system includes a motor, and a motor control system that estimates a position of the motor. The estimation includes sending an input command to the motor to cause the position of the motor to change. The estimation further includes measuring a current $I_{abc}$ across the motor. The estimation further includes extracting a filtered current $I_{abc\_inj}$ at a predetermined frequency from the current $I_{abc}$. The estimation further includes estimating the position of the motor using the filtered current $I_{abc\_inj}$.

These and other advantages and features will become more apparent from the following description taken in conjunction with the drawings.

DETAILED DESCRIPTION

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
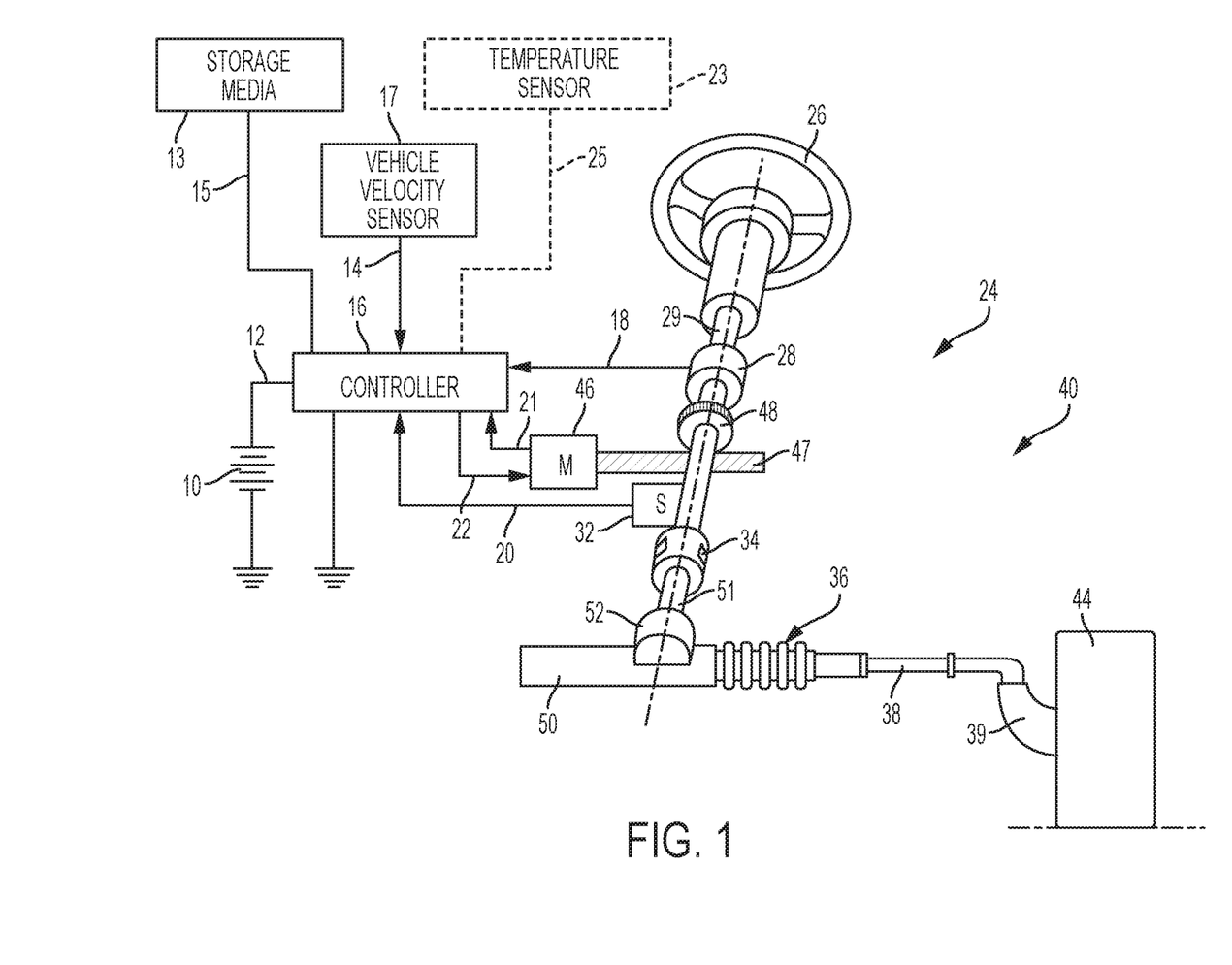
FIG. 1 is an exemplary embodiment of an electric power steering system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 2:
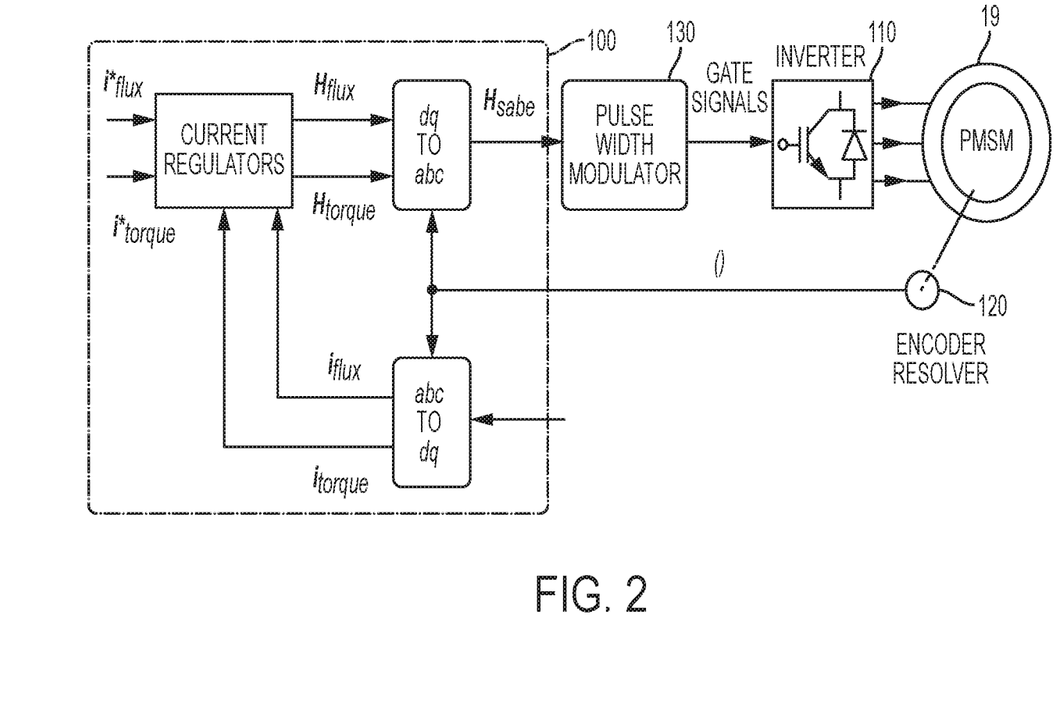
FIG. 2 depicts a block diagram of a field oriented controlled PMSM drive system.

Field oriented control (FOC) is a typical control methodology adopted in industrial PMSM drive systems. FIG. 2 depicts a block diagram of a field oriented controlled PMSM drive system. As is shown, an encoder or resolver 120 measuring the rotor position is used in FOC controlled drive system 100 to regulate the torque and magnetic field accurately and independently. It is desirable to have position-sensor-less control, i.e., controlling the PMSM 19 without a position sensor. Position-sensor-less control has advantages such as reduced system cost and complexity, and enhanced system reliability. For example, the position-sensor-less control can be used in several industrial applications such as pumps and fans. Typically, such applications have relatively lower requirements for system's dynamic responses.

However, position estimation/sensor-less control is challenging at low speed of operation, below a predetermined threshold, especially for low saliency machines such as SPMs. The technical solutions described herein facilitate low-speed position estimation technique for low saliency machines.

In general, typical techniques of rotor position estimation for PMSMs can be classified into two categories: fundamental model based observer and pole identification based on motor saliency. The observer based on fundamental machine model works well for mid-to-high speed. However, it is no longer effective for zero-to-low speed operation because the variables to be observed, e.g., back-EMF or stator flux, are relatively low in magnitude and will be interfered by measurement noises. In this case, the saliency or anisotropy on PMSM 19, which is the physical property of the motor 19, can be used to identify direct-axis (d-axis) and quadrature-axis (q-axis) of the PMSM 19. This property has been proved to be effective in identifying the poles of interior PMSMs, in which the permanent magnets are buried into the rotor so that the saliency is significant due to the difference on d- and q-axis magnetic flux loops. Low saliency PMSMs, e.g., the surface-mounted PMSMs, in which the magnets are evenly glued on the surface of the round rotor, pose a technical challenge for magnetic pole identification. The electromagnetic design for such a motor does not provide much information to distinguish the d- and q-axis of the PMSM.

Figure 3:
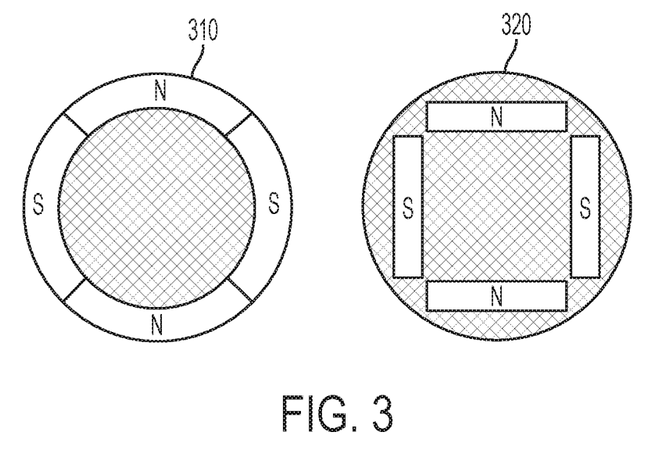
FIG. 3 depicts rotor structure and magnet placement of a surface-mounted and interior PMSMs according to one or more embodiments.

FIG. 3 depicts rotor structure and magnet placement of a surface-mounted and interior PMSMs according to one or more embodiments. The structure 310 of surface mounted permanent magnets causes the PMSM 19 to have low saliency compared to the higher saliency caused by the structure 320 with internally mounted permanent magnets.

Typically, high frequency signal injection, more generally known as the high frequency injection (HFI) technique, is utilized to identify the magnetic poles of the PMSM 19 under zero-low speeds, in case of interior permanent magnet machines, or more generally, for machines with sufficient saliency. When high frequency sinusoidal voltage is injected to the motor 19, sinusoidal current at the same frequency is aroused. The impedance can then be calculated from the magnitudes of the injected voltages and currents. Generally, this method is applicable to a PMSM 19 with anisotropies, e.g., the interior PMSM 19, in which the flux paths across the direct-axis (d-axis) and quadrature-axis (q-axis) are different due to the asymmetrical placement of the magnets. The mathematical model of the general PMSM 19 in the synchronous reference frame, can be expressed as follows.

$$\begin{bmatrix} V_d \\ V_q \end{bmatrix} = \begin{bmatrix} R + L_d s & \omega_e L_q \\ -\omega_e L_d & R + L_q s \end{bmatrix} \begin{bmatrix} I_d \\ I_q \end{bmatrix} + \begin{bmatrix} 0 \\ \omega_e \lambda_{pm} \end{bmatrix} \qquad (1)$$

Here, R is resistance, s is Laplace operator (complex frequency), $\lambda_{pm}$ is the permanent magnet flux linkage, $\omega_e$ is motor speed, L is inductance, with $L_d$ being inductance for the d-axis, and $L_q$ being the inductance for the q-axis, and V is voltage, $V_d$ being voltage across the d-axis, and $V_q$ being voltage across the q-axis.

The resultant equivalent impedance across the q-axis is $$Z_q = \sqrt{(R^2 + (2\pi f_{inj})^2 L_q^2)} \approx (V_{qinj} - \bar{\omega}_e \lambda_{pm})/I_{qinj} \qquad (2)$$

where $f_{inj}$ is the frequency of the injected signal, $V_{qinj}$ and $I_{qinj}$ are the magnitudes of q-axis injected voltage and current, respectively, and $\hat{\omega}_e$ is the electrical motor speed on the rotor shaft.

Because the change on inductance associated with the rotor position is more significant, the sinusoidal signal with high frequency is typically adopted to make resistance negligible. Meanwhile, because the time constant of the PMSM's mechanical system is relatively large which damps the high frequency disturbance torque, the shaft speed can be approximated by zero. In this case, Eq. (2) can be simplified as $$Z_q \approx 2\pi f_{inj} L_q \approx V_{qinj}/I_{qinj} \qquad (3)$$

Similarly, the equivalent impedance across the d-axis can be written as $$Z_d = \sqrt{(R^2 + (2\pi f_{inj})^2 L_d^2)} \approx V_{dinj}/I_{dinj} \qquad (4)$$

$$Z_d \approx 2\pi f_{inj} L_d \approx V_{dinj}/I_{dinj} \qquad (5)$$

Figure 4:
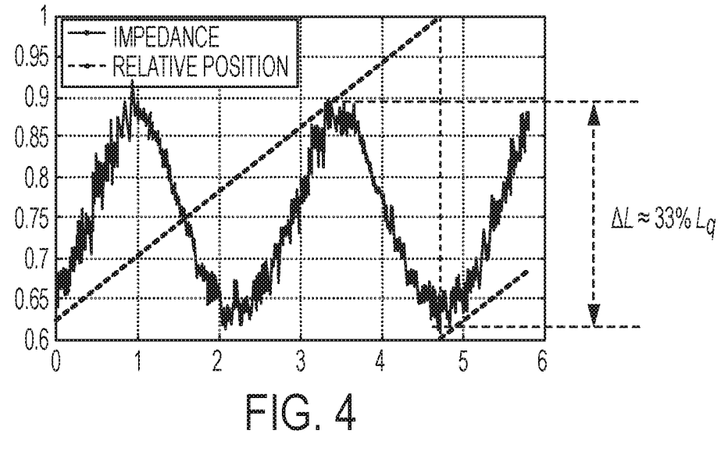
FIG. 4 SHOWS impedance versus the relative position between the injection axis and the d-axis on an interior PMSM.

By calculating the impedance on the axis in which the high frequency voltage/current signal is injected (referred herein as an injection axis), the relative position between the injection axis and the d-axis can be obtained. The impedance on the injection axis $Z_{inj}$ can be expressed by $$Z_{inj} \approx 2\pi f_{inj} L_{inj} \approx V_{inj}/I_{inj} \qquad (6)$$

where $L_{inj}$ is the inductance on the injection axis, and $Z_{inj}$ is in the range of $[Z_d, Z_q]$. The impedance versus the relative position between the injection axis and the d-axis on an interior PMSM 19 is shown in FIG. 4.

Figure 5:
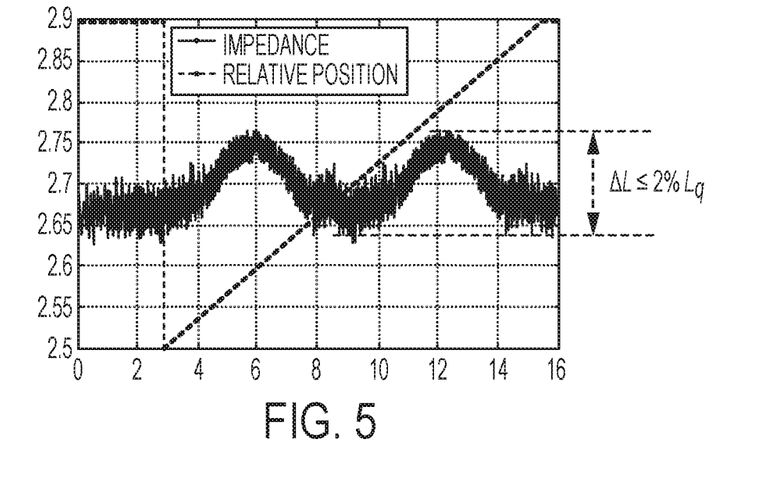
FIG. 5 shows impedance versus the relative position between the injection axis and the d-axis on a surface-mounted PMSM.

For a surface-mounted cylindrical PMSM 19, the line-to-line inductance is typically almost constant irrespective of the rotor position. The impedance versus the relative position between the injection axis and the d-axis on a surface-mounted PMSM 19 is shown in FIG. 5, as determined using the HFI technique.

It can be seen from FIG. 4 that the impedance difference between d-axis and q-axis, $\Delta L$, for the interior PMSM 19, is about 33% of $L_q$. However, for a surface-mounted PMSM 19, the $\Delta L$ is less than 3% of $L_q$. Therefore, the saliency of the surface-mounted PMSM 19 (relevant to $\Delta L$) may not be significant enough to extract the rotor position. The technical solutions described herein address this technical challenge by creating a pseudo saliency that can be used to determine the rotor position.

Referring back to Eqs. (2) and (4), for a surface-mounted cylindrical PMSM in which $L_d$ is approximately equal to $L_q$, the induced current by injecting voltage signal to the motor 19 can be obtained as.

$$I_{qinj} \approx (V_{inj} - \overline{\omega}_e \lambda_{pm}) / \sqrt{(R^2 + (2\pi f_{inj})^2 L_q^2)} \quad (7)$$

$$I_{dinj} \approx V_{inj} / \sqrt{(R^2 + (2\pi f_{inj})^2 L_d^2)} \approx V_{inj} / \sqrt{(R^2 + (2\pi f_{inj})^2 L_q^2)} \quad (8)$$

From Eqs. (7) and (8), when $\omega_e=0$, which is the case when the frequency of the injected signal is much higher than the cut-off frequency of the mechanical system, the induced currents on d-axis and q-axis are identical. However, if the frequency of the injected signal is close to the cut-off frequency of the mechanical system, which means $\overline{\omega} \neq 0$, then there is a difference on the d-axis and q-axis currents due to the vibration induced back-EMF, i.e., $\overline{\omega}_e \lambda_{pm}$.

Figure 6:
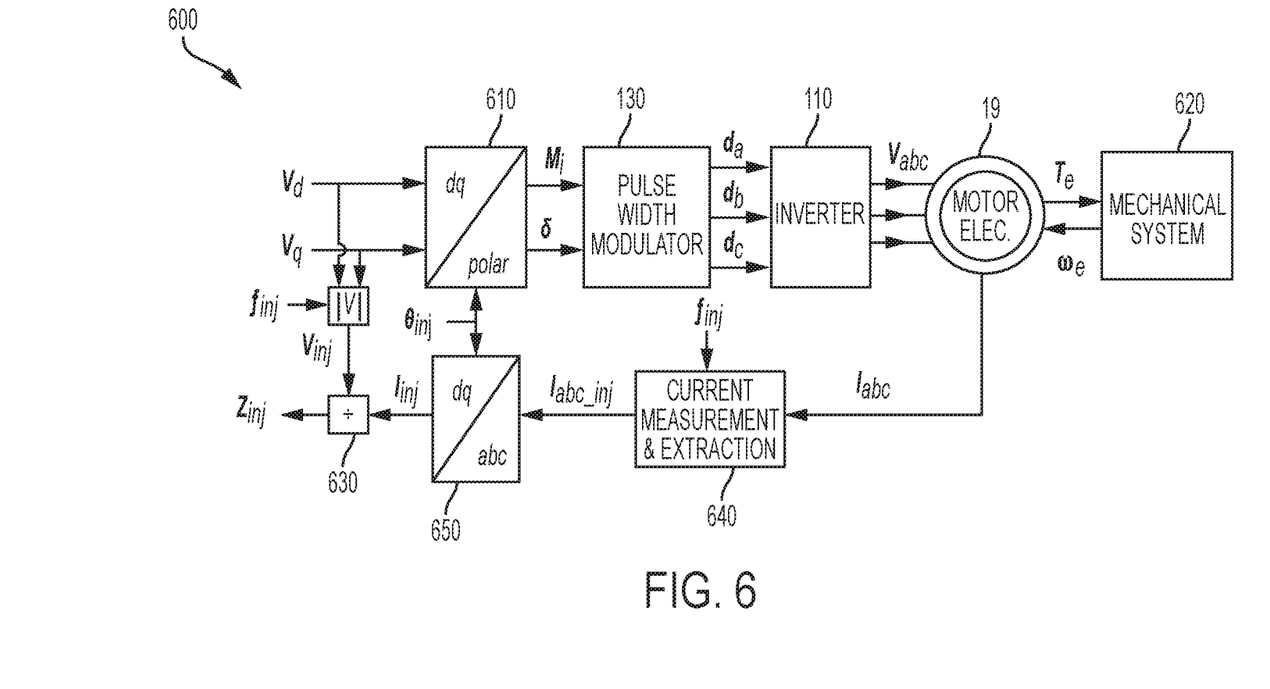
FIG. 6 depicts a block diagram illustrating how the induced currents at the injection frequency are obtained from the motor control system for a PMSM to compute the equivalent impedance according to one or more embodiments.

FIG. 6 depicts a block diagram illustrating how the induced currents at the injection frequency are obtained from the motor control system for a surface mounted PMSM according to one or more embodiments.

Referring to FIG. 6, the control system 600 includes a synchronous to stationary reference frame transformation block 610. The block 610 performs inverse park transformation on received voltage input signals $V_d$ and $V_q$ for the d-axis and q-axis respectively and the injected position signal. The block 610 provides resulting $M_i$ and $\delta$ to a pulse width modulator 130, which in turn provides the three phase output da, db, and dc, to the inverter 110. The inverter 110 converts the modulator output into and provides voltage command to the PMSM 19 to cause the PMSM 19 to displace, and in one or more examples, to cause corresponding torque $T_c$ in a mechanical system 620. In one or more examples, the torque causes the mechanical system to operate at a speed $\omega_e$.

To determine the rotor position at low, near-zero speed, below a predetermined threshold, the control system 600 is configured to input $V_d$ and $V_q$ that cause the mechanical system 620 to vibrate physically. Such physical vibration causes the PMSM 19 with surface mounted magnets to have a measurable saliency. Such a pseudo saliency is created by injecting voltage/current at a frequency $f_{inj}$ to make the mechanical system (rotor) 620 to vibrate at the same frequency $f_{inj}$ as the injected signals. Because the equivalent impedance at various rotor positions are different, the impedance during the physical vibration is computed to extract rotor position without using a position sensor based on the pseudo saliency.

The control system 600 includes an impedance calculation module 630 to calculate the impedance values of the mechanical system (rotor) 620 on the d-axis and q-axis. Further, a current measurement system 640 provides a measured current across the PMSM 19 as another input value to the impedance calculation module 630. The current measurement system 640 can include one or more current sensors that measure the current across the PMSM 19. The current measurements $I_{abc}$ are filtered using a bandpass filter to extract the current components at the predetermined frequency $f_{inj}$ at which input signals are injected, in one or more examples. The filtered measured currents $I_{abc\_inj}$ are input to the impedance calculation module 630. The filtered measured currents are converted into dq-axis measurements by using a stationary to synchronous frame transformation block 650 (also known as the park transformation block) from the three phase measurement values.

Using the equations (4) and (5), the impedance calculation module 630 can compute the impedance values $Z_{inj\_q}$ and $Z_{inj\_d}$ and the corresponding difference between the computed impedance values. The difference can be used to determine the position ($\theta_{inj}$) of the rotor in the mechanical system 620, for example using a look up table or a dynamic formula that is based on the empirical data providing a relationship between the impedance difference and the rotor positions (for example, FIG. 5B-C). For example, the lookup table can be used to determine an estimated rotor position corresponding to the calculated impedance.

Figure 7:
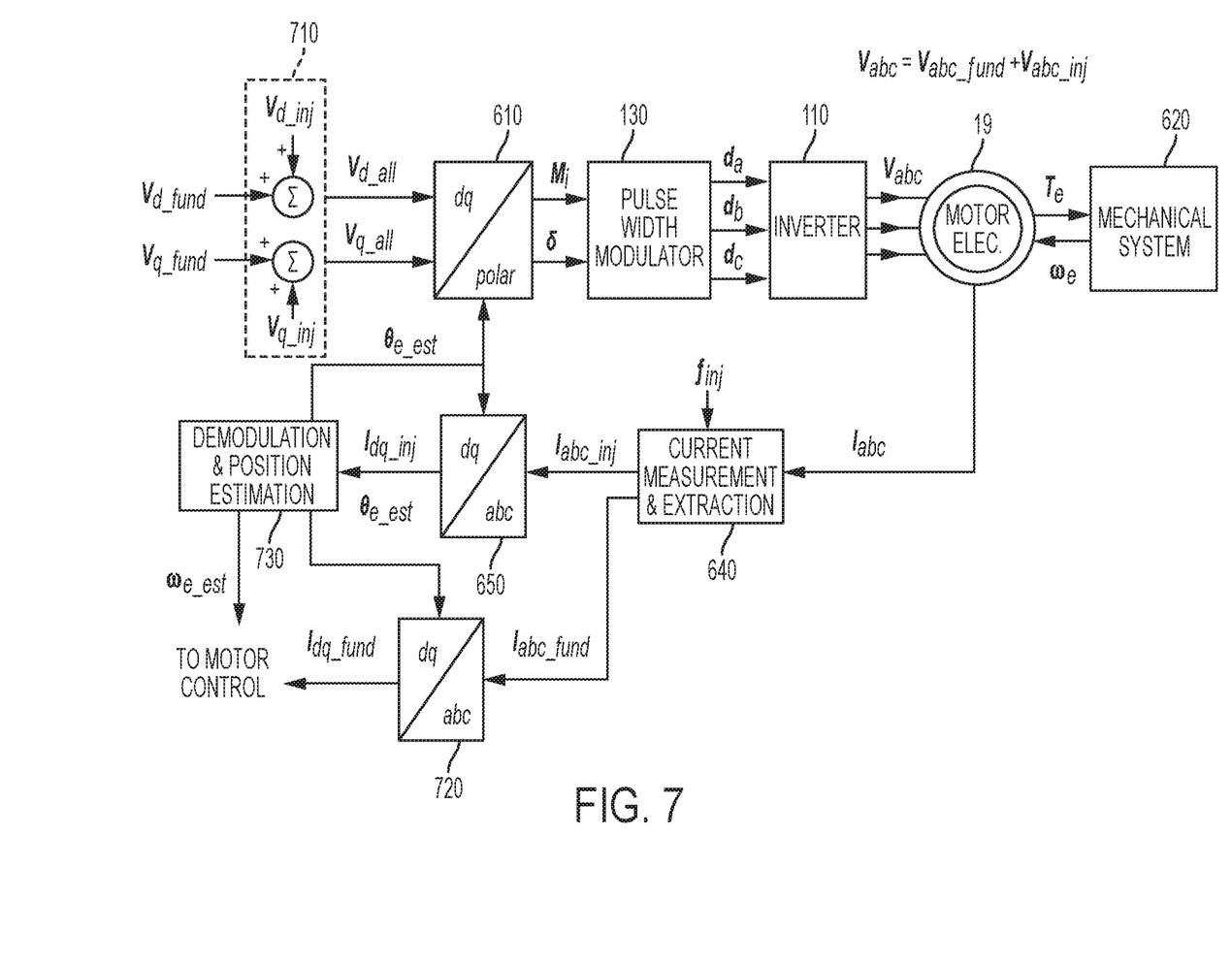
FIG. 7 depicts a dataflow diagram for position-sensor-less determination of rotor position for a surface mounted PMSM according to one or more embodiments.
Figure 8A:
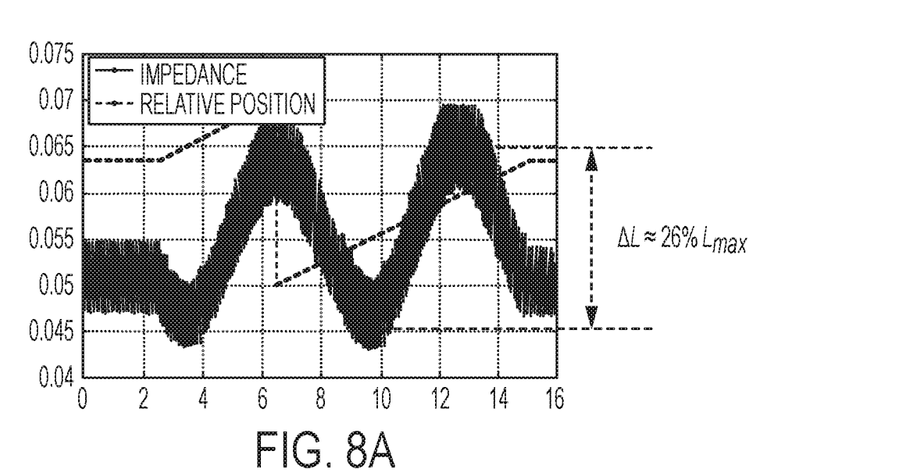
FIG. 8A and FIG. 8B depict equivalent impedance vs. relative position for a surface mounted permanent (SPM) motor.
Figure 8B:
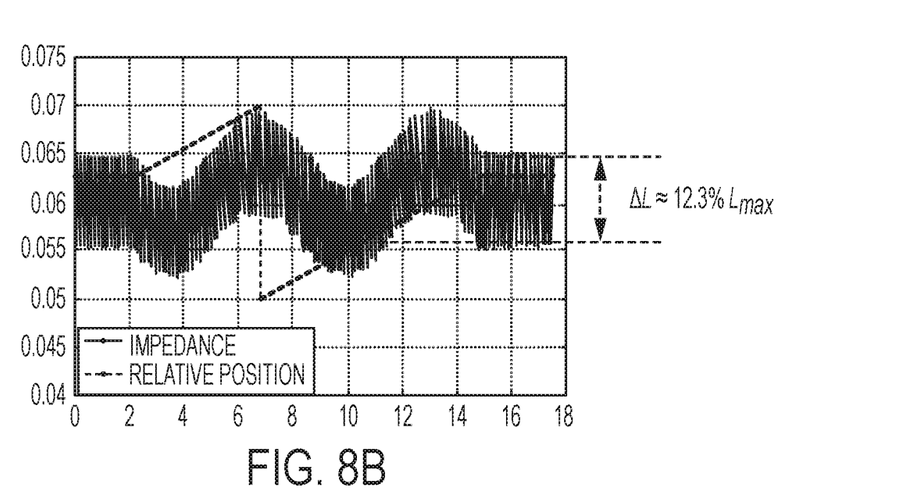

FIG. 7 depicts a dataflow diagram for position-sensor-less determination of rotor position for a surface mounted PMSM according to one or more embodiments. Further, FIG. 8A and FIG. 8B depict equivalent impedance vs. relative position for a surface mounted permanent (SPM) motor according to one or more embodiments of the present invention. In the illustrated embodiment of the present invention voltage values ($V_{d\_inj}$ and $V_{q\_inj}$) are injected, however in other embodiments of the present invention, current values can be injected instead.

As shown, the voltage injection signals are added with the input voltage commands for the PMSM 19 at 710. The resulting input voltage values on the d-axis and q-axis are converted to $M_i$ and $\delta$ in the polar coordinate frame by block 610, which are received by the pulse width modulator 130, which in turn generates the values in the phasor coordinate frame—$d_a$, $d_b$, and $d_c$. The inverter 110 receives the phasor inputs, which in turn causes the voltage $V_{abc}$ across the PMSM 19 to be corresponding to the input voltage values $V_{abc\_fund}$ and injected voltage signals $V_{abc\_inj}$. Here, $V_{dq\_fund}$ are voltage commands received to cause the motor 19 to move and generate torque in the mechanical system 620. The $V_{dq\_inj}$ comprise the modification signal that is injected into the $V_{dq\_fund}$ input commands to cause the motor 19 to vibrate and exhibit pseudo saliency. The modification signal $V_{dq\_inj}$ has a predetermined frequency $f_{inj}$, which may be below a predetermined threshold.

Further, the current measurement system 640 extracts the current measurements $I_{abc\_inj}$ corresponding to the frequency $f_{inj}$ of the input injection signals from the current $I_{abc}$ at the PMSM 19. The current measurement system 640 extracts the current measurements using a bandpass filter that selects the current measurements corresponding to the frequency $f_{inj}$. The block 650 receives the current measurements $I_{abc\_inj}$ and generates corresponding current measurements $I_{dq\_inj}$ in the dq-axis frame. The current measurement system 640, in one or more examples, also extracts the current measurement $I_{abc\_fund}$ which is the current corresponding to the input voltage commands $V_{d\_fund}$ and $V_{q\_fund}$ without taking the injection signals into account. The current measurement system 640 extracts the current measurement $I_{abc\_fund}$ using the bandpass filter, and in this case measuring the current values outside the bandpass filter range corresponding to $f_{inj}$. The current measurement $I_{abc\_fund}$ is received by a block 720 that determines the corresponding current measurement $I_{dq\_fund}$ as the output current of the system corresponding to the input voltage commands $V_{dq\_fund}$.

Further yet, at block 730, the current measurements $I_{dq\_inj}$ are used for computing the position ($\theta_{est}$) of the rotor of the mechanical system 650 by determining equivalent impedance $Z_{inj}$ as described herein. Further, at the block 730, the estimated position can be used to determine an estimated velocity $\omega_e$ of the rotor, for example by computing a derivative of the estimated position over time. The estimated position and velocity of the rotor are fed back to the motor control system for generating input signals for the next iteration in a closed loop system.

It should be noted that there are several ways to excite the mechanical vibration on motor shaft speed/position via signal injection. For example, instead of injecting voltage signal, an alternative can be enforcement of sinusoidal current with a constant magnitude at a predetermined frequency. Due to the effect of the vibration induced saliency, the voltage that generates the constant magnitude current at different rotor positions is different. Hence, the voltage signals obtained from the current regulator can be used to estimate the rotor position or the equivalent impedance, similar to the method described above. The current regulator can be a proportional-integral (PI) controller, in one or more examples, or any other type.

Figure 9:
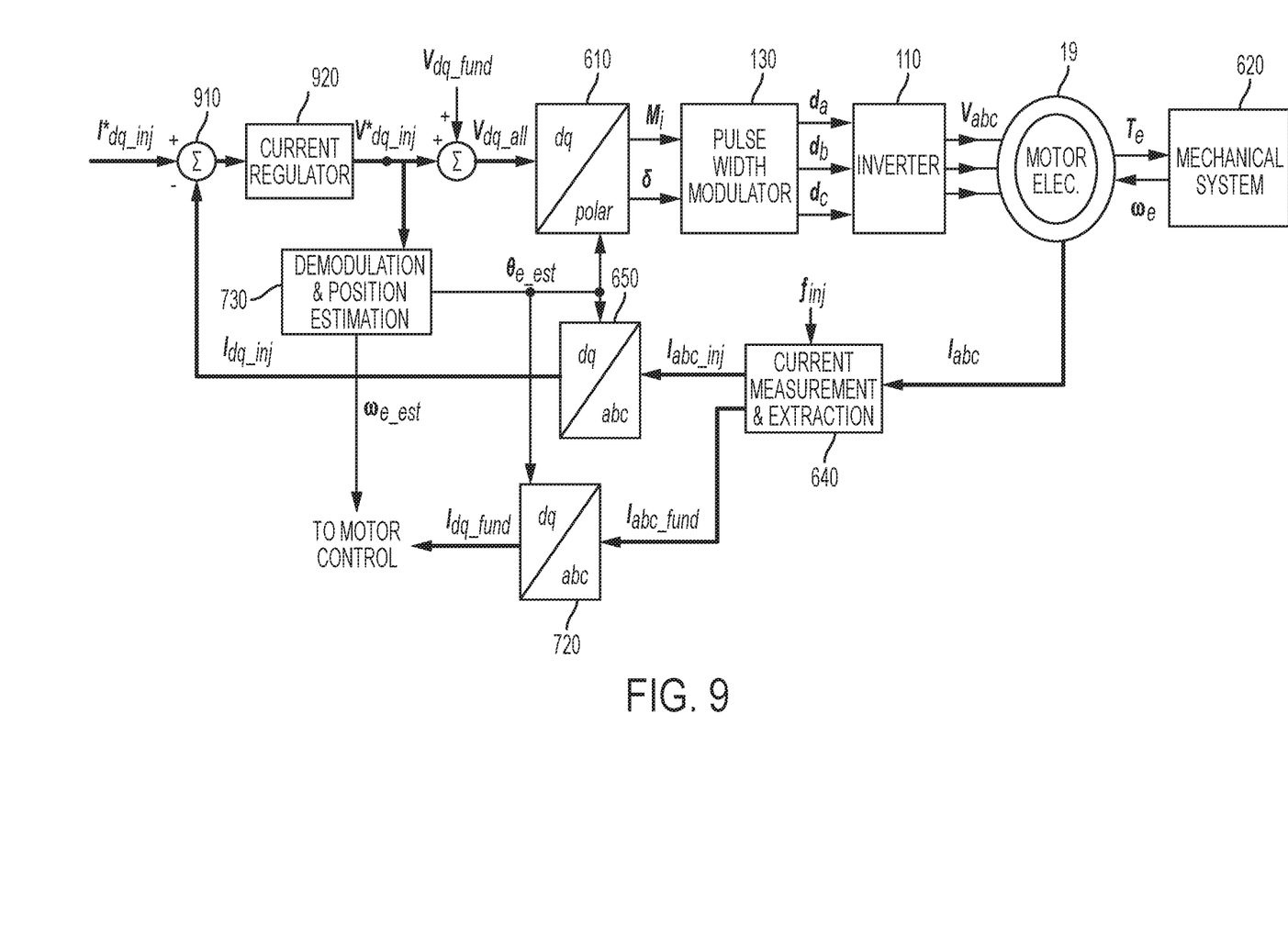
FIG. 9 depicts a dataflow diagram for position-sensor-less determination of rotor position for a PMSM according to one or more embodiments.

FIG. 9 depicts a dataflow diagram for position-sensor-less determination of rotor position for a surface mounted PMSM according to one or more embodiments using current signal injection. As shown, a modification signal calculation is performed dynamically using the $I_{dq\_inj}$ measured by the block 650 using the park transformation. A modification signal calculation module 910 receives the $I_{dq\_inj}$ as input from the block 650, which is then combined (added/subtracted) with a predetermined $I^*_{dq\_inj}$ that is provided to a current regulator 920 to generate the modification signal $V_{dq\_inj}$. The current regulator 920 generates the $V_{dq\_inj}$ values that are forwarded to the demodulation and position estimation module 730. The $V_{dq\_inj}$ values are further used to modify the input commands $V_{dq\_fund}$ being sent to the motor 19, as described earlier. The sensor-less position estimation is performed in a closed loop manner. The other modules illustrated operate as described herein.

Thus, the technical solutions described herein implement a vibration induced saliency for PMSM systems with SPM motors. The technical solutions herein facilitate generating anisotropy artificially although there is almost none on the motor structurally. The technical solutions herein thus facilitate a position-sensor-less control to be used in low or no saliency PMSM drive systems. The technical solutions described herein facilitate creating pseudo saliency by causing a physical vibration in the mechanical system by injecting a voltage/current signal into the input command, the injected signals being at a predetermined frequency below a predetermined threshold. The vibration induced saliency in the SPM motor is used to compute an impedance, which in turn is used to compute an estimated position of the rotor. The technical solutions described herein, by estimating motor position for SPM motors at low (substantially zero) speeds, below a predetermined threshold, improve system reliability and reduce hardware cost by not requiring to use a position sensor.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The estimated position can be used as an input to the motor control system to implement a closed loop control of the motor. Additionally, the estimated position can be used for any other application in the motor control system apart from measuring motor velocity, motor acceleration, and the like. Further yet, in one or more examples, the sensor-less estimation of the motor position described herein can be performed in addition to a sensor-based motor position detection. For example, the estimated rotor position can be used in either control or observation purposes, depending on the system requirements. In sensor-less control mode, the estimated rotor position is used directly in the synchronous to stationary reference frame transformation (inverse Park transformation) to convert the voltage fundamental components. While in position-based estimation mode, the real position signal (from the sensor) is a feedback in the inverse Park transformation (610). The sensor-less estimation is, in such cases, used to verify/validate the position sensor used for the motor position detection. Alternatively, or in addition, the sensor-less estimate is used in one or more operations while the sensor-based position is used in another set of operations.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only

Having thus described the invention, it is claimed:

1. A permanent magnet synchronous machine comprising:
   a motor control system configured to provide an input command to a motor to cause a position of the motor to change sinusoidally at a predetermined frequency, the input command comprising a base input signal and a sinusoidal modification signal, the sinusoidal modification signal causing the motor to vibrate causing the position of the motor to change sinusoidally at the predetermined frequency; and
   a motor position estimation module configured to estimate the position of the motor, the estimation comprising:
   measuring a current $I_{abc}$ across the motor, wherein the current $I_{abc}$ includes a based current signal and a modification current signal;
   extracting a filtered current $I_{abc\_inj}$ at the predetermined frequency from the current $I_{abc}$;
   determine, using the filtered current $I_{abc\_inj}$ and the input command, an impendence corresponding to a pseudo saliency resulting from the sinusoidal position change of the motor; and
   estimating the position of the motor based on the impendence.

2. The permanent magnet synchronous machine of claim 1, wherein the position is estimated when the motor is operating below a predetermined speed.

3. The permanent magnet synchronous machine of claim 1, wherein the predetermined frequency is less than a predetermined threshold.

4. The permanent magnet synchronous machine of claim 1, wherein the input command comprises a d-axis input voltage command $V_d$ and a q-axis input voltage command $V_q$.

5. The permanent magnet synchronous machine of claim 4, wherein the modification signal comprises a d-axis injection signal $V_{d\_inj}$ and a q-axis injection signal $V_{q\_inj}$.

6. The permanent magnet synchronous machine of claim 1, wherein the input command comprises a d-axis input current command $I_d$ and a q-axis input current command $I_q$.

7. The permanent magnet synchronous machine of claim 6, wherein the modification signal comprises a d-axis injection signal $I_{d\_inj}$ and a q-axis injection signal $I_{q\_inj}$.

8. The permanent magnet synchronous machine of claim 1, wherein the estimated position of the motor is used to determine a speed of the motor.

9. A method for determining a motor position using vibration induced saliency, the method comprising:
   measuring a current $I_{abc}$ across a motor, the current caused by an input command to the motor to cause a position of the motor to change sinusoidally at a predetermined frequency, the input command comprising a base input signal and a sinusoidal modification signal, the sinusoidal modification signal causing the motor to vibrate causing the position of the motor to change sinusoidally at the predetermined frequency;
   extracting a filtered current $I_{abc\_inj}$ at the predetermined frequency from the current $I_{ab}$; the current $I_{abc}$ comprising a base current signal and a modification current signal;
   determining, using the filtered current $I_{abc\_inj}$ and the input command, an impedance corresponding to a pseudo saliency resulting from the sinusoidal position change of the motor; and
   estimating the position of the motor using the impedance.

10. The method of claim 9, wherein the position is estimated when the motor is operating below a predetermined speed.

11. The method of claim 9, wherein the predetermined frequency is less than a predetermined threshold.

12. The motor of claim 11, wherein the input command comprises a d-axis input voltage command $V_d$ and a q-axis input voltage command $V_q$, and wherein the modification signal comprises a d-axis injection signal $V_{d\_inj}$ and a q-axis injection signal $V_{q\_inj}$.

13. The method of claim 9, wherein the input command comprises a d-axis input current command $I_d$ and a q-axis input current command $I_q$, and wherein the modification signal comprises a d-axis injection signal $I_{d\_inj}$ and a q-axis injection signal $I_{q\_inj}$.

14. The method of claim 9, wherein the method further comprises:
   determining an impedance of the motor based on the filtered current $I_{abc\_inj}$; and
   determining the position based on the impedance.

15. A power steering system comprising:
   a motor; and
   a motor control system configured to estimate a position of the motor, the estimation comprising:
   sending an input command to the motor to cause the position of the motor to change sinusoidally at a predetermined frequency, the input command comprising a base input signal and a sinusoidal modification signal, the sinusoidal modification signal causing the motor to vibrate causing the position of the motor to change sinusoidally at the predetermined frequency, wherein the predetermined frequency includes a frequency equal to or less than a cut-off frequency of a mechanical system corresponding to the motor;
   measuring a current $I_{abc}$ across the motor, the current $I_{abc}$ comprising a base current signal and a modification current signal;
   extracting a filtered current $I_{abc\_inj}$ at the predetermined frequency from the current $I_{abc}$;
   determining, using the filtered current $I_{abc\_inj}$ and the input command, an impedance corresponding to a pseudo saliency resulting from the sinusoidal position change of the motor; and
   estimating the position of the motor using the impedance.

16. The power steering system of claim 15, wherein the position is estimated when the motor is operating below a predetermined speed.

17. The power steering system of claim 15, wherein the predetermined frequency is less than a predetermined threshold.

18. The power steering system of claim 15, wherein the input command comprises a d-axis input voltage command $V_d$ and a q-axis input voltage command $V_q$, and wherein the modification signal comprises a d-axis injection signal $V_{d\_inj}$ and a q-axis injection signal $V_{q\_inj}$, the $V_{d\_inj}$ and the $V_{q\_inj}$ having the predetermined frequency.

19. The power steering system of claim 15, wherein the input command comprises a d-axis input current command $I_d$ and a q-axis input current command $I_q$, and wherein the modification signal comprises a d-axis injection signal $I_{d\_inj}$ and a q-axis injection signal $I_{q\_inj}$, the $I_{d\_inj}$ and the $I_{d\_inj}$ having the predetermined frequency.

20. The power steering system of claim 15, wherein the estimation further comprises:
   determining an impedance of the motor based on the filtered current $I_{abc\_inj}$; and
   determining the position based on the impedance.

* * * * *